Patented Dec. 23, 1952

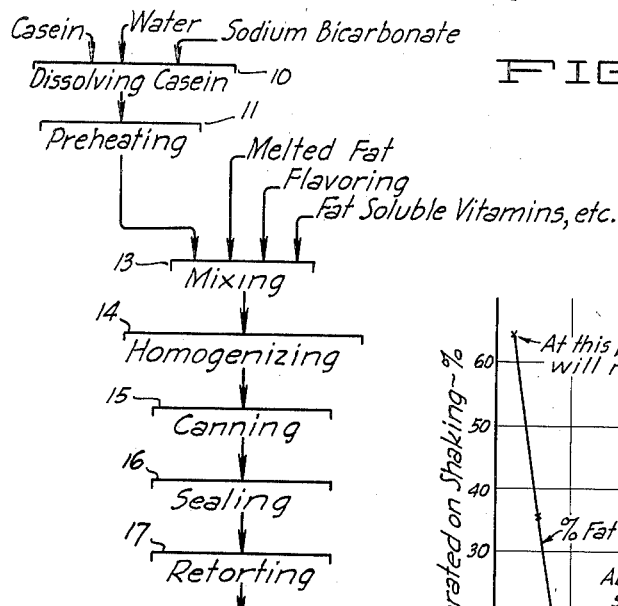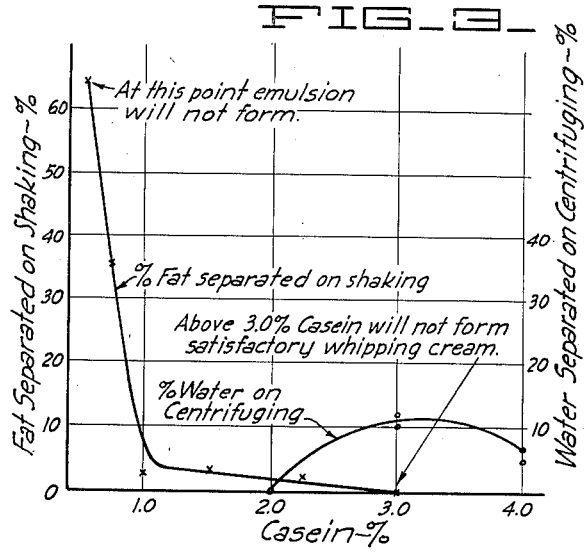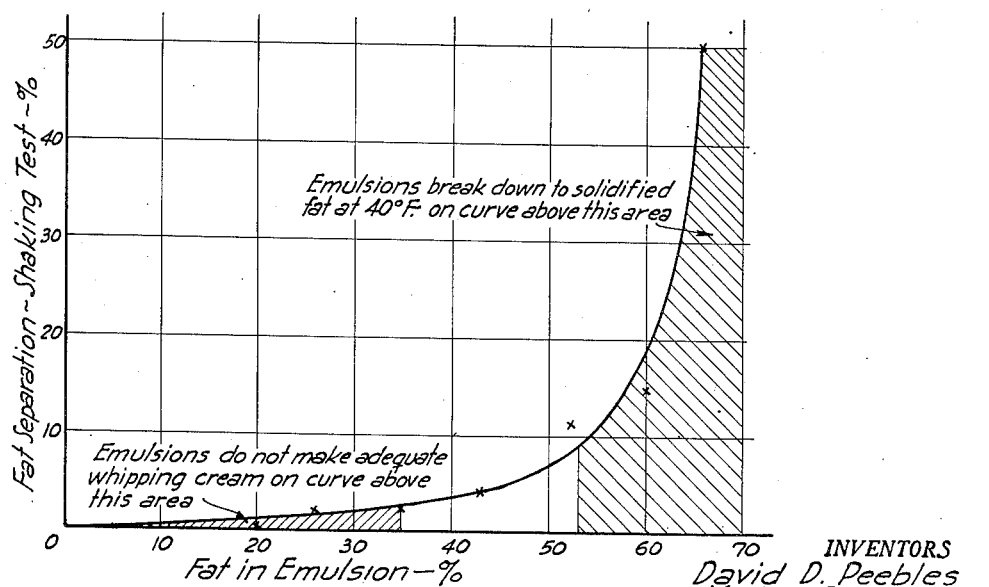

2,622,984

UNITED STATES PATENT OFFICE 2,622,984

FAT EMULSION AND METHOD OF MANUFACTURE

David D. Peebles, Hillsborough, and Murray D. Girvin, San Anselmo, Calif., assignors to Western Condensing Company, San Francisco, Calif., a corporation of California Application September 5, 1950, Serial No. 183,188

4 Claims. (Cl. 99—63)

This invention relates generally to water-fat emulsions and particularly to emulsions which are suitable for the preparation of fat containing food products such as reconstituted milk.

In the past water-fat emulsions have been prepared in conjunction with the manufacture of various food products for human consumption. For example in the manufacture of certain milk products, milk solids not fat (e. g. skim milk powder) are mixed with water, butter or other fat containing material is added, and then the material homogenized to emulsify the fat. Emulsions prepared in this manner are not as stable as generally desired, and the processing steps required are best adapted to commercial rather than domestic use. We have found that there is a need for a water-fat emulsion which can be manufactured and sold in preserved form, and which can be used by a housewife to enrich various materials and mixtures, including reconstituted milk, dairy milk (skim milk or whole), whipping mixtures, ice cream mixes and the like. In the course of our work on edible fat emulsions we have found that stability to resist heat sterilization and refrigeration, flavor, and the ability of the emulsion to form good whipping mixtures, are important characteristics in the manufacture of an acceptable product.

In general it is an object of the present invention to provide a substantially stable water-fat emulsion which can be used in the preparation of various mixtures and products, and which has sufficient stability and keeping properties to be marketed in sealed containers without refrigeration.

Another object of the invention is to provide an edible water-fat emulsion which has sufficient stability to withstand heat sterilization and refrigeration, and which has such flavor characteristics that it will not impart any off flavor to products to which it is added.

Another object of the invention is to provide a high quality water-fat emulsion which can be used by a housewife to enrich various materials and mixtures, including for example reconstituted milk, dairy milk, whipping mixtures, ice cream mixes and the like.

Another object of the invention is to provide a stable water-fat emulsion which is capable of withstanding heat sterilization to temperatures in excess of 212° F. without development of off flavor, and which can be marketed to the trade in sealed cans or like containers.

Another object of the invention is to provide a stable fat emulsion which can be used in preparing reconstituted milk suitable for such purposes as the feeding of canine whelps and other animals.

Additional objects of the invention will appear from the following description in which the preferred embodiments of the invention have been set forth in detail in conjunction with the accompanying drawing.

Referring to the drawing:

Figure 1 is a flow sheet illustrating one procedure for manufacturing our emulsion.

Figures 2 and 3 are curves serving to illustrate the critical nature of the amount of fat and sodium caseinate employed.

In general the present invention involves the preparation of a highly stable water-fat emulsion which can be used to prepare reconstituted milk, or for the enrichment of such products as fresh skim milk, whole milk, ice cream mixes and the like.

We have found that the stability of a water-fat emulsion and its suitability for the purposes outlined herein, is dependent upon a number of properties. For example the emulsion should not separate out or break down when subjected to shaking such as may be applied to material during shipment and handling, before it reaches the consumer. There should be no separation or break down of the emulsion when it is permitted to stand over long periods of time at ordinary room temperatures. Also it should be capable of withstanding temperatures of the order of 40° F. such as are employed in ordinary household refrigerators, and which may be encountered during shipment or storage.

In addition to the above factors it is important that the material be capable of withstanding heat sterilization to relatively high temperatures of the order of 240° F., and such as must be employed in retorting the canned material to insure against bacterial contamination. Thus the emulsion must not break down or separate at such temperatures, and off flavors must not be developed during such processing.

We have found that many so-called stabilizers which are commonly used in the preparation of fat emulsions are not suitable for the purposes of the present invention because they do not make possible stable emulsions capable of withstanding sterilizing temperatures of the order of 240° F.

We have discovered that a relatively simple composition making use of sodium caseinate as an emulsifying agent will produce the requisite stable water-fat emulsion, provided the proportioning of the ingredients employed is kept within certain specified limits. Sodium caseinate is peculiar in that when used in amounts as hereinafter specified it does not have any off flavor of itself, and furthermore when care is taken to maintain the pH of the emulsion within specified limits hereinafter stated, high temperature heat sterilization does not produce objectionable off flavor.

Our composition can be best understood after describing the preferred procedure for its manufacture, illustrated in the attached flow sheet. Thus a measured amount of edible casein is shown being mixed with water at 10, together with sodium bicarbonate, to provide a solution of sodium caseinate. In this operation it is desirable to supply heat in order to elevate the temperature to about from 120 to 150° F. A small amount of an alginate, such as sodium alginate, is preferably added to impart greater viscosity to the final product. If desired the alginate can be added at a later stage of the process. Other materials can be used in place of alginates to impart greater viscosity, such as various vegetable gums.

The edible casein employed can be one manufactured from skim milk by acid coagulation, and may be either a fresh wet curd, or a dry granular or powdered material. If a wet casein curd is employed then the quantity of water employed should be adjusted accordingly.

In the next step 11 the casein solution is heated for a short period to an elevated temperature of the order of 190 to 200° F. During this treatment some carbon dioxide from the sodium bicarbonate is evolved. As will be presently explained this preheating is desirable in that it serves to stabilize the solution with respect to its pH value, and serves to prevent undesirable changes in pH during the heat sterilizing operation.

In the next step 13 a melted fat is mixed with the casein solution, and at this time we may also add any desired flavoring material, together with various fat soluble vitamins, such as carotine, vitamin A and the like. The ingredients are now thoroughly intermixed and whipped. The mixed material is then subjected to homogenizing at 14, to produce a water-fat emulsion. Homogenizing is preferably carried out at an elevated temperature of from 120 to 165° F., about 140° F. being optimum.

After being thoroughly homogenized the material is placed in cans at 15, by the use of ordinary can filling machinery, and after the filled cans are sealed at 16, they are subjected to a retorting operation 17, for heat sterilization. Retorting can be to a temperature of about 240° F. for a retention time of about 14 minutes. After retorting the material is cooled and is then ready for marketing.

The proportioning of ingredients employed can range as follows:

|  | Per cent |
| --- | --- |
| Water | 45 to 89 |
| Sodium bicarbonate | .05 to 0.2 |
| Casein (dry) | 1.2 to 3.0 |
| Fat | 10.0 to 52 |
| Sodium alginate | 0.0 to 0.15 |
| Remainder fat soluble vitamin concentrates and flavoring. | |

The sodium caseinate produced by reaction of casein with sodium bicarbonate, is from about 1.2 to 3.1%, in the above general formula.

The optimum proportioning is as follows:

|  | Per cent |
| --- | --- |
| Water | 54 to 62 |
| Sodium bicarbonate | 0.05 to 0.20 |
| Casein (dry) | 1.5 to 2.25 |
| Fat | 35 to 45 |
| Sodium alginate | 0.03 to 0.08 |
| Remainder fat soluble vitamin concentrates and flavoring. | |

The sodium caseinate produced in the last mentioned formula is from about 1.5 to 2.3%. The viscosity of the material ranges from about 8,000 to 20,000 centipoises and the material is in the nature of a fluid rather than a semisolid or paste.

In carrying out the above method it has been found that there is a critical relationship between pH and flavor. If the pH value is above about 7.2 (e. g. pH 8.0) at the time of heat sterilization, development of off flavors has been noted. Our process is controlled in such a manner that the pH at the time of heat sterilization is within a relatively narrow range of about 6.8 to 7.2, from 6.9 to 7.0 being preferred. Within this pH range heat sterilization can be carried out in the manner previously described without development of off flavor.

Previous reference has been made to the use of sodium bicarbonate to dissolve the casein and form sodium caseinate in operation 10. The use of this reagent facilitates dissolution of the casein without development of excessive alkalinity. After evolution of carbon dioxide in the preheating operation 11, the solution is stable with respect to its pH value, and is not temporarily altered as to pH during the high temperature heat sterilization at 17. In some instances it may be desirable to adjust the pH value after preheating of the casein solution, or in the mixing operation 13. Thus at this point we can introduce small amounts of sodium carbonate or sodium di or tri phosphates, or citric or lactic acids, to raise or lower the hydrogen ion concentration accordingly. In the absence of preheating at 11 a temporary change or drift in alkalinity tends to take place in the retorting operation 17, and this introduces a factor in the process which is difficult to control, and which may cause temporary development of sufficient alkalinity to cause an off flavor in the final product.

The casein can be dissolved in a solution of sodium carbonate, in which event preheating at 11 can be omitted. However sodium bicarbonate with preheating is preferred, because it appears to enable better flavor characteristics.

The fat content employed should be relatively pure and free from fatty acid. It preferably has a melting point of the order of 90 to 110° F. Washed, unsalted dairy butter can be employed, or purified butter oil. In addition we may use any one of a number of edible hydrogenated vegetable oils, such as a hydrogenated cottonseed oil which has a melting point within the range specified. For less expensive products suitable for animal feeding we can use animal fats such as lard or tallow. As a butter flavoring for use with fats other than butter or butter oil a suitable synthetic commercial product can be employed, such as a product containing ethyl butyrate or like esters, caprylic acid, bitter almond and like essential oils, and traces of aldehydes and ketones. Also we have used cultured butter flavors.

When butter or butter oil is employed it is desirable to add a small amount of a suitable antioxidant, such as 0.15% tocopherol, or 0.005% of butylated hydroxyanisole, or mixtures of such substances. This serves to prevent off flavor during high temperature sterilization.

By way of example, in one instance the process was carried out as follows: 1,280 grams of edible casein (in dry granular form) was dissolved in 32,300 grams of water at about 160° F., together with 62 grams of sodium bicarbonate. The solution thus formed was heated to a temperature of 190° F. for a period of 60 minutes, and then cooled to 160° F. There was then added 40 grams of sodium alginate, 22,700 grams of melted hydrogenated cottonseed oil (at 120 to 140° F.), 2.1 grams of butter flavoring and fat soluble vitamin concentrates as follows:

12,000 international units carotin per pound of fat
3,000 international units vitamin A, as vitamin A alcohol, per pound of fat.
5,000 international units vitamin D concentrate in irradiated ergosterol, per pound of fat.

All of the above ingredients were thoroughly intermixed and then whipped by agitation to homogeneously intermix the ingredients. The material was then homogenized at a temperature of 140° F. by passing the same twice through a two valve Manton-Gaulin homogenizer. The pressure drop across each of the two valves was 2000 p. s. i. for the first pass, and for the second pass 1500 p. s. i. The material produced by such homogenization was a relatively homogeneous emulsion in the form of a liquid. It was placed in cans, the cans sealed, and then heat sterilized at 240° F. During sterilization the cans were gradually heated to 240° F. over a period of 15 minutes, held at 240° F. for 14 minutes and then cooled to near room temperature in a period of about 6 minutes. The pH value of the emulsion immediately before and after heat sterilization, was about pH 7.0.

The final emulsion analyzed as follows:

| | Per cent |
|---|---|
| Water | 57.776 |
| Sodium caseinate | 2.25 |
| Hydrogenated fat | 40 |
| Sodium alginate | 0.07 |
| Vitamin concentrates and flavoring | 0.004 |

It is apparent from the above that we have provided an oil-in-water emulsion in which the important ingredients are semi-solid fat such as hydrogenated vegetable oil or butter fat, and sodium caseinate as emulsifying agent. Although small amounts of other materials may be optionally added, the balance is essentially water. Also, substantially all of the protein present is the soluble protein of the sodium caseinate and the amount of this protein is relatively small when compared with either the water or fat.

Various laboratory tests have demonstrated the remarkable stability of our water-fat emulsion. Thus in a shaking test, 200 grams of emulsion have been placed in a quart jar and shaken 120 times per minute for one hour at 70° F. The amount of fat separation has been determined by the Babcock test. With our emulsion substantially no fat separation or breakdown takes place when subjected to this test, thus demonstrating that it has sufficient stability to withstand vibration and handling to which it may be subjected during shipment and storage.

To determine its ability to withstand separation during storage, it has been subjected to centrifuging for ten minutes at 2000 R. P. M. and at 75° F., in a laboratory type centrifuge. When subjected to this test our material does not reveal any appreciable breakdown or water separation.

Another test (whipping cream test) to which our emulsion has been subjected is to use it together with nonfat milk solids to form a whipping cream. Thus two level tablespoons of nonfat skim milk solids (i. e. spray dried skim milk powder) can be mixed with two tablespoons of warm water, and this mixture blended with 14 tablespoons of fat emulsion. This material when smooth is chilled to near 32° F., in a refrigerator, after which it is whipped by use of a standard electrical beater until the volume has been increased by 100%. The whipping cream thus formed is checked for stability and body, that is its ability to maintain its volume upon standing for extended periods of time, and its viscosity. Our emulsion, when used in this whipping cream test provides a highly stable whip which can be stored for 12 hours or more at 40° F. without material loss of volume or separation. The viscosity of the whip is well within the limits specified.

Another test (cold storage test) which we have employed and which is useful in determining stability, is to store the emulsion at a temperature of 40° F. for an extended period of time, such as twenty-four hours. Such a test reveals the ability of the material to be stored in ordinary household refrigerators, and also its ability to withstand low temperatures to which it may be subjected during shipment or storage. Many water-fat emulsions when subjected to this test break down due to crystallization of the fat content. Our emulsion withstands this test without noticeable breakdown, and without any crystallization of the fat content.

Previous reference has been made to the fact that our composition is critical with respect to the amount of fat present. When a composition contains less than about 30% fat, but is otherwise the same as previously described, creams made from the emulsion do not whip satisfactorily. Thus such an emulsion is not suitable for preparing whips such as are commonly prepared by a housewife for use with desserts, pastries, etc. Should one attempt to increase the fat content above 52%, the emulsion tends to become unstable to shaking, particularly in that the fat globules tend to more readily agglomerate to break down the emulsion. In addition the emulsion is no longer stable at 40° F., because the fat crystallizes.

The critical relationship referred to above is illustrated in Figure 2. The curve in this instance has been plotted between the percent of fat in the emulsion, on the horizontal axis, and the extent of fat separation when subjected to the shaking test on the vertical axis. Note that below about 35% the emulsions do not make adequate whipping creams. Above about 52% fat, the emulsions break down to solidified fat (i. e. fat crystals) when stored at a temperature of 40° F. Thus as illustrated by this curve the required stable characteristics are obtained for a percentage of fat ranging from about 30 to 52% (35 to 45% preferred), assuming that one desires a material suitable for whipping. If good whipping properties are not required then the fat content can be as low as about 10%.

A further critical relationship is illustrated in the curve of Figure 3. The curves in this instance have been plotted between the percent of casein on the horizontal axis, and on the two vertical axes, the percent of fat separation when subjected to the shaking test, and the percent water separation when subjected to the centrifuge test. Both of the curves in this figure were plotted for a water-fat emulsion made according to the present invention and containing 40% fat, but with the percentage of casein varied. Note that below about 1.2% casein, the emulsion rapidly loses its stability, and tends to more readily break down on shaking. As indicated in the curve of Figure 3, above about 3% casein the emulsion would not form a satisfactory whipping cream, when subjected to the whipping test previously mentioned. Furthermore from 2 to 3% casein, there is a rapid increase in the percent of breakdown on centrifuging, which becomes particularly noticeable beyond about 3% (corresponding to about 3.1% sodium caseinate).

Previous reference has been made to maintenance of the pH between relatively close limits in order to prevent development of off flavor. In addition to this critical factor, it should be noted that below pH 6.8 the fat commences to crystallize out of the emulsion at ordinary room temperatures. About pH 7.5 creams prepared from the emulsions will not properly whip. Above pH 7.5, as for example say pH 8.0, the flavor is noticeably impaired. Thus as previously stated we preferably maintain the pH value from 6.8 to 7.2, the optimum being from 6.9 to 7.0.

As previously mentioned our stable emulsion is desirable for the manufacture of reconstituted milk. Thus reconstituted milk simulating whole dairy milk can be prepared as follows: A quart jar is filled half full of warm water and to this water there is added one measure (equal to 9⅓ level tablespoons) of edible skim milk powder. The skim milk powder should be of good quality without off flavor. The jar is shaken vigorously about 30 times, and then one smaller measure (equal to 7 level tablespoons) of our water-fat emulsion is added. The jar is again shaken, after which cold water is added to fill the jar, allowing time for foam to settle. The jar is then stored in a refrigerator to chill before using.

It will be noted that the procedure outlined above can be carried out without difficulty by the housewife, particularly in that it does not require any homogenizing. The reconstituted milk produced by this procedure is of high quality, and is comparable in every way to ordinary fresh whole dairy milk. Its keeping properties both at room temperature and under refrigeration are superior to fresh whole milk.

If the housewife desires richer milk, or a low fat milk, the amount of emulsion used can be increased or decreased accordingly.

To form a whipping material the housewife can add two level tablespoons of skim milk powder to two tablespoons of warm water, after which these ingredients are intermixed with a common egg beater. Two measures (same as above) of our emulsion are then added, and the material blended by stirring until smooth. It is then chilled to a temperature of about 40° F., after which it is whipped in the same manner as ordinary whipping cream. By following this procedure the housewife can prepare a stable whip which can be used for a variety of purposes, such as for desserts, pastries, etc.

It will be evident from the foregoing that we have provided an emulsion which will not impart off flavors to materials to which it may be added, although it is heat sterilized when canned. It has a high degree of stabiilty when subjected to the various tests previously outlined, which is attributed both to its composition and the proportions employed.

While our composition is desirable for human consumption, it can be used to advantage for feeding animals. Thus for feeding canine whelps the fat can be lard or tallow, and the emulsion can be added to delactosed skim milk solids to produce a milk similar in general analysis to bitches' milk.

We claim:

1. A substantially stable oil-in-water emulsion comprising about 10 to 52% by weight of semi-solid fat, about 1.2 to 3.1% sodium caseinate as emulsifying agent and the remainder essentially water, the amount of said water ranging between 45 and 89%, substantially all of the protein in said emulsion being soluble and being the casein of said sodium caseinate, said emulsion being sterilized and having a pH between 6.8 and 7.2.

2. A substantially stable oil-in-water emulsion comprising about 35 to 52% by weight of semi-solid fat, about 1.2 to 3.1% sodium caseinate as emulsifying agent and the remainder essentially water, the amount of said water ranging between 45 and 62%, substantially all of the protein in said emulsion being soluble and being the casein of said sodium caseinate, said emulsion being sterilized and having a pH between 6.8 and 7.2.

3. A substantially stable oil-in-water emulsion comprising about 10 to 52% by weight of semi-solid fat having a melting point between approximately 90 and 110° F., about 1.2 to 3.1% sodium caseinate as emulsifying agent and the remainder essentially water, the amount of said water ranging between 45 and 89%, substantially all of the protein in said emulsion being soluble and being the casein of said sodium caseinate, said emulsion being sterilized and having a pH between 6.8 and 7.2.

4. A substantially stable oil-in-water emulsion comprising about 35 to 52% by weight of semi-solid hydrogenated vegetable oil, about 1.2 to 3.1% sodium caseinate as emulsifying agent and the remainder essentially water, the amount of said water ranging between 45 and 62%, substantially all of the protein in said emulsion being soluble and being the casein of said sodium caseinate, said emulsion being sterilized and having a pH between 6.8 and 7.2.

DAVID D. PEEBLES.
MURRAY D. GIRVIN.

REFERENCES CITED

The following references are of record in the file of this patent:

UNITED STATES PATENTS

| Number | Name | Date |
| --- | --- | --- |
| 2,279,205 | Parsons et al. | Apr. 7, 1942 |
| 2,511,119 | Mitchell, Jr. | June 13, 1950 |